United States Patent
Bach et al.

[11] 3,729,235
[45] Apr. 24, 1973

[54] INTEGRATED BRAKE BOOSTER AND ADAPTIVE BRAKING MODULATOR

[75] Inventors: Lloyd G. Bach; Richard L. Lewis, both of South Bend, Ind.

[73] Assignee: The Bendix Corporation, South Bend, Ind.

[22] Filed: Sept. 3, 1971

[21] Appl. No.: 177,729

[52] U.S. Cl. ............................ 303/21 F, 60/54.5 P
[51] Int. Cl. ................................................ B60t 8/12
[58] Field of Search ............................. 60/54.5 P; 188/181 A; 303/6 C, 10, 21 F

[56] References Cited

UNITED STATES PATENTS

| | | | |
|---|---|---|---|
| 3,666,328 | 5/1972 | Williams | 303/21 F |
| 3,671,085 | 6/1972 | Pasek et al. | 303/21 F |
| 3,679,270 | 7/1972 | Jania | 303/21 F |

*Primary Examiner*—Duane A. Reger
*Attorney*—Ken C. Decker et al.

[57] ABSTRACT

A vehicle hydraulic braking system is disclosed which includes a single device which not only provides a power assist to the vehicle operator when the brakes are applied, but also serves as an adaptive braking modulator. The device includes a housing defining a pressure chamber therewithin, and a number of pistons, one piston for each control channel of the adaptive braking system, which are slidably mounted within the chamber. When the vehicle operator effects a brake application, a valve within the housing admits high pressure fluid from a pressure source into the pressure chamber for urging the pistons in a brake-applying direction. However, when the adaptive braking system senses an incipient skid condition at one of the vehicle's wheels, pressures are equalized on the opposite ends of a corresponding one of the pistons, to thereby permit a spring to yieldably urge the piston in a brake release direction, thereby relieving the braking pressure in the affected brake.

19 Claims, 5 Drawing Figures

INVENTORS
LLOYD G. BACH
RICHARD L. LEWIS

INVENTORS
LLOYD G. BACH
RICHARD L. LEWIS

INVENTORS
LLOYD G. BACH
RICHARD L. LEWIS

INVENTORS
LLOYD G. BACH
RICHARD L. LEWIS

INTEGRATED BRAKE BOOSTER AND ADAPTIVE BRAKING MODULATOR

BACKGROUND OF THE INVENTION

This invention relates to an adaptive braking system for use in an automotive vehicle.

Although many adaptive braking systems for automotive vehicles are known to the prior art, most of the systems are quite complicated and require a number of separate modulators to control braking pressure communicated to the vehicle's brakes. Furthermore, almost all of the heavier vehicles manufactured today require a device that provides a power assist to the vehicle operator when a brake application is effected. Of course, when a number of separate modulators are provided in a braking system in addition to the booster unit which provides the power assist, the cost of the braking system is greatly increased. Therefore, it is desirable to provide an adaptive braking modulator and a power booster unit in a common housing, to thereby reduce the number of parts required for the braking system.

SUMMARY OF THE INVENTION

Therefore, an important object of our invention is to substantially reduce the cost of providing an adaptive braking system for an automotive vehicle.

Another important object of our invention is to provide a power brake booster and adaptive braking modulator in a common housing.

Another important object of our invention is to provide a relatively inexpensive four-wheel adaptive braking system which includes at least a pair of adaptive braking control channels.

Another important object of our invention is to substantially reduce the number of separate components required for an automotive adaptive braking system.

DETAILED DESCRIPTION OF THE PREFERRED EMBODIMENT

Figure 1:
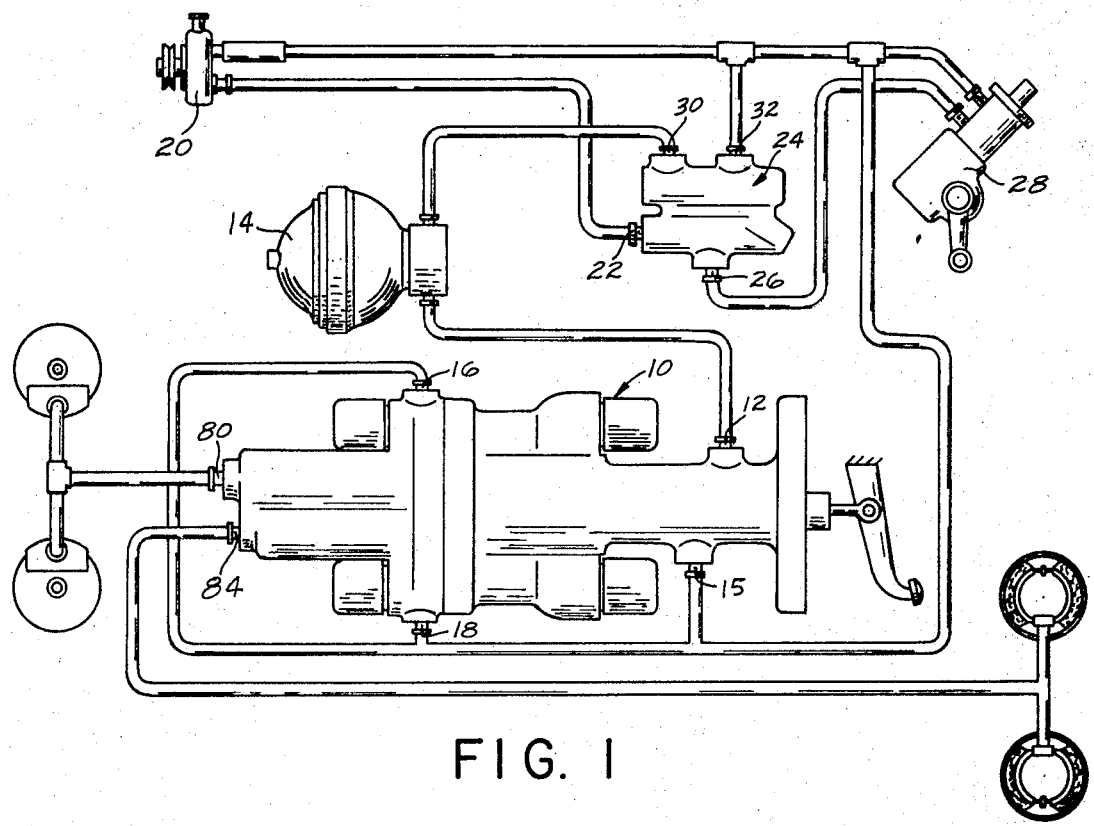
FIG. 1 is a schematic illustration of a "closed-center" vehicle hydraulic system which incorporates an integrated brake booster and adaptive braking modulator made pursuant to the teachings of our present invention.
Figure 3:
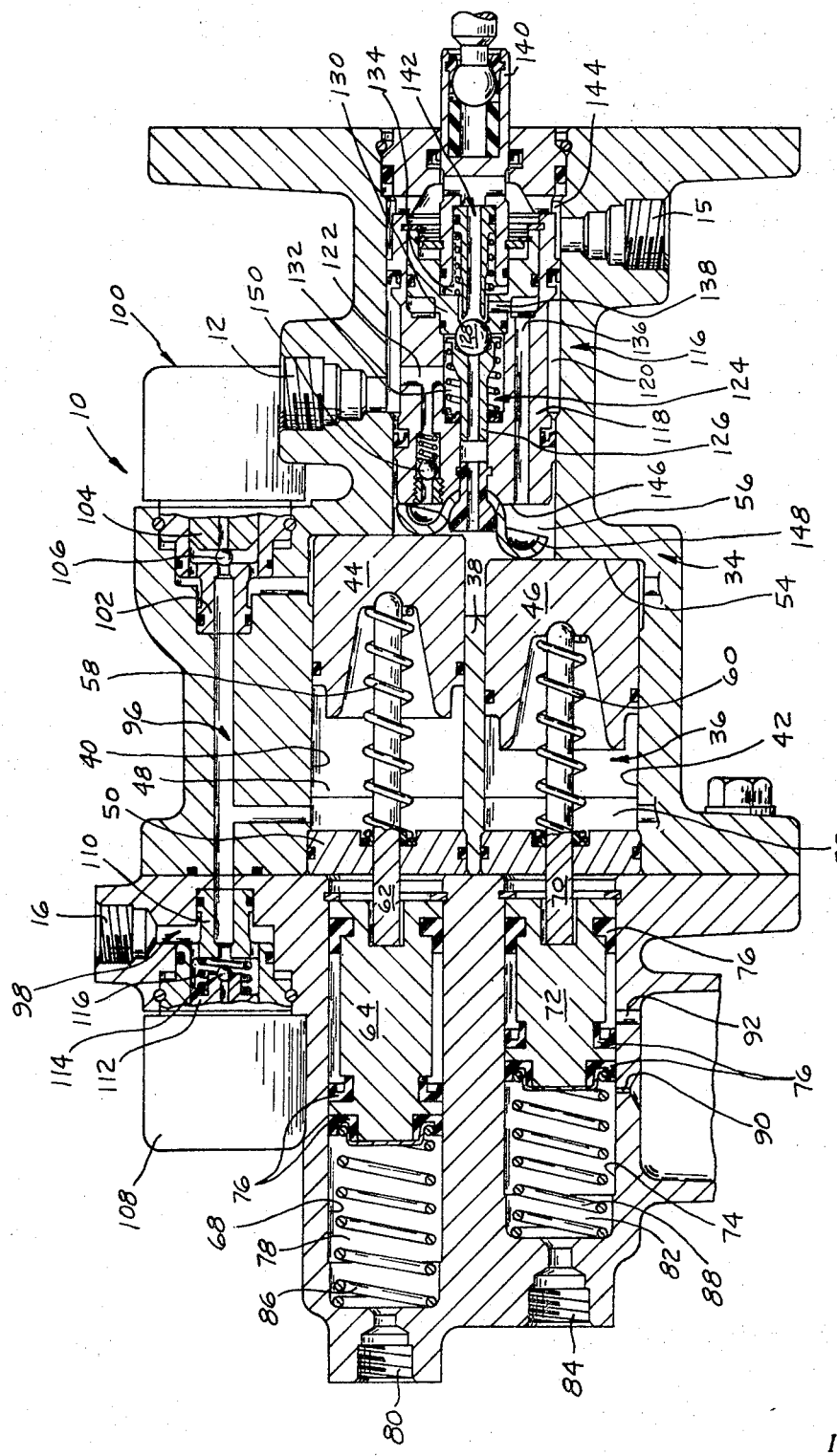
FIG. 3 is a longitudinal cross-sectional view of the integrated hydraulic brake booster and adaptive braking modulator used in the hydraulic system illustrated schematically in FIG. 1.

Referring now to FIGS. 1 and 3 of the drawing, an integrated hydraulic brake booster and adaptive braking modulator generally indicated by the numeral 10 is provided with an inlet port 12 which is communicated to a suitable fluid storage device such as an accumulator 14 which stores hydraulic fluid under a relatively high pressure. The booster-modulator 10 is provided with return ports 15, 16, and 18, each of which is communicated to the inlet or low pressure side of the vehicle power steering pump 20. The outlet or high pressure side of the power steering pump 20 is communicated to an inlet port 22 of a charging valve generally indicated by the numeral 24, which may be of any suitable type well known to those skilled in the art, but which is preferably made pursuant to the teachings of copending U.S. Pat. application Ser. No. 99,796, filed Dec. 21, 1970, owned by the assignee of the present invention and incorporated herein by reference. The outlet port 26 of the charging valve 24 is communicated to the inlet of the vehicle's power steering gear 28, and another outlet port 30 of the charging valve 24 is communicated to the inlet of the accumulator 14. The return port 32 of the charging valve 24 is communicated to the inlet or low pressure side of the pump 20, as is the outlet of the power steering gear 28. As disclosed in the aforementioned patent application, the charging valve 24 is adapted to create sufficient back pressure in the vehicle's hydraulic system to provide a relatively high source of fluid for charging the accumulator 14, while permitting sufficient flow through the charging valve to operate the power steering gear 28.

Referring now to FIG. 3, the booster-modulator 10 includes a housing 34 defining a pressure chamber 36 therewithin. A partition 38 divides the pressure chamber 36 into a first section 40 and a second section 42. A first piston 44 is slidably mounted in the section 40 and a second piston 46 is slidably mounted in the section 42. A first compartment 48 is defined between the left-hand end of the piston 44 and the end 50 of the pressure chamber 36, and a similar compartment 52 is defined between the left-hand end of the piston 46 and the end 50 of the pressure chamber 36. The right-hand end of the pistons 44 and 46, and the end of the partition 38, which extends only part of the way through the pressure chamber 36, cooperate with the right-hand end 54 of the pressure chamber 36 to define a common fluid compartment 56 therebetween. Springs 58, 60 yieldably urge the pistons 44 and 46, respectively, toward the end 54 of the pressure chamber 36. A connecting member 62 extends through the end wall 50 of the pressure chamber 36 and interconnects the piston 44 with another piston 64 which is slidably mounted in a bore 68 within the housing 10. Similarly, another connecting member 70 also extends through the end wall 50 and connects the piston 46 with another piston 72 slidably mounted in another bore 74. The piston 64 and 72 are nearly identical to pistons currently being used in standard automotive master cylinders and are provided with appropriate seals 76 in a manner well known to those skilled in the master cylinder art. A pressure chamber 78 is defined between the end of the piston 64 and the corresponding end of the bore 68 which is communicated to the front wheel disc brakes of the vehicle through an outlet port 80. Similarly, the end of the piston 72 cooperates with the corresponding end of the bore 74 to define another pressure chamber 82 therebetween which is communicated to the rear wheel drum brakes of the vehicle through the outlet port 84.

Springs 86, 88 yieldably urge the pistons 64 and 72, respectively, to the right viewing FIG. 3, toward the brake release position. A compensating port 90 and a seal port 92 communicates a fluid reservoir or container 94 with the bore 74 in a manner well known to those skilled in the master cylinder art. Although the container 94 is shown at the bottom of the bore 74 for convenience, in practice the container 94 would be mounted in such a way that fluid will communicate into the bore 74 by gravity. A similar container and compensating and fill ports (not shown) are provided for the bore 68.

First passage means generally indicated by the numeral 96 communicates the compartment 48 with the compartment 56, and second passage means generally indicated by the numeral 98 communicates the compartment 48 with the return port 16. A normally closed solenoid valve 100 includes a valve seat 102 mounted in the first passage means 96 and an armature 104 which carries a sphere 106 which is adapted to sealingly engage the seat 102 to control fluid communication through the first passage means 96. The solenoid valve 100 is normally closed such that fluid communication through the first passage means 96 is prevented unless the solenoid valve 100 is energized. A second solenoid valve 108 controls fluid communication through the passage 98 and includes a valve seat 110 within the passage 98 and an armature 112 which carries a sphere 114 which cooperates with the valve seat 110 to control fluid communication through the passage 98. A spring 116 is provided to normally urge the sphere 114 away from the valve seat 110, so that when the solenoid valve 108 is not energized, fluid communication is permitted through the second passage means 98. The electrical terminals of both the solenoid valves 100 and 108 are connected to the output terminals of an electronic control unit (not shown) which senses an incipient skid of a corresponding vehicle wheel and signals the solenoid valves 100 and 108 to relieve the braking pressure as will hereinafter be explained. The electronic control unit may incorporate any desired logic system, such as the logic system disclosed in U.S. Pat. No. 3,494,671 owned by the assignee of the present invention and incorporated herein by reference. Of course, an additional pair of solenoid valves and corresponding first and second passage means are provided which control communication between the compartments 52 and 56. However, since this structure is identical to the structure described hereinabove, it is not illustrated in FIG. 3, and will not be described in detail. The solenoid valves which control fluid communication between the compartment 52 and the compartment 56 and between the compartment 52 and the reservoir are controlled by a second control channel incorporated within the aforementioned electronic control unit.

Fluid communication between the chamber 56 and the accumulator 14 is controlled by valve means generally indicated by the numeral 116. Valve means 116 includes a cartridge 118 which is slidably mounted within the housing 34 and which cooperates with the latter to define an annular chamber 120 which is communicated to the accumulator 14 by the inlet port 12. A passage 122 communicates the annular chamber 120 with a compartment 124 within the cartridge 118 in which a valve stem 126 which carries a sphere 128 is slidably mounted. A valve seat 130 divides the compartment 124 into an inlet section 132 and an outlet section 134. The inlet section is communicated with the annular chamber 120, and the outlet section 134 is communicated to the compartment 56 by passages 136 and 138. An operator-operated input rod 140 is slidably mounted within the cartridge 118. The right-hand end of the input rod 140 (not shown) is connected to the usual brake pedal mounted in the vehicle operator's compartment, while the left-hand end of the rod 140 is adapted to sealingly engage the sphere 128 to urge the latter away from the valve seat 130 when a brake application is effected. Passage means generally indicated by the numeral 142 are provided within the input rod 140 and communicate the outlet section 134 of the compartment 124 with a chamber 144 defined between the right-hand end of the cartridge 118 and the end wall of housing 24. The return port 15 communicates the chamber 144 with the reservoir at the inlet or low pressure side of the pump 20, as explained in detail hereinabove.

The left-hand end 146 of the cartridge 118 defines a portion of the end wall 54 of the pressure chamber 56 and is provided with a caster 148, which is pivotally mounted on the end 146 of the cartridge 118. The caster 148 is adapted to engage the right-hand end of the pistons 44 and 46 for a purpose to be described hereinafter. A check valve 150 permits fluid communication between the compartment 56 and the annular chamber 120 when the pressure in the latter is less than the pressure in the compartment 56, but prevents flow of fluid in the reverse direction.

MODE OF OPERATION OF THE PREFERRED EMBODIMENT

The various components of the booster-modulator 10 are illustrated in FIG. 3 in the positions which they assume when the brakes of the vehicle are released. In this condition, the compartment 56 is vented to the return port 15 through the passages 136, 138, and 142. When a brake application is effected, the input rod 140 is urged to the left, until the left-hand end of the latter sealingly engages the sphere 128 to thereby terminate fluid communication between the compartments 56 and the return port 15. As the input rod 140 is moved further to the left, fluid is permitted to flow through the valve seat 130, so that the compartment 56 is communicated with the high pressure fluid stored in the accumulator 14. High pressure fluid in the compartment 56 acts upon the right-hand end of the pistons 44 and 46, urging the latter to the left. As the pistons 44 and 46 are advanced to the left, the pistons 64 and 72 are also advanced to the left, thereby developing braking pressure in the chambers 78 and 82 in a manner well known to those skilled in the master cylinder art. High pressure fluid in the chambers 78 and 82 is communicated to the front and rear brakes of the vehicle respectively for actuating the latter.

When the electronic control unit senses an incipient skidding condition in, for example, the front wheel brakes, the solenoid valves 100 and 108 are actuated to terminate fluid communication between the compartment 48 and the return port 16 and to initiate fluid communication through the first passage means 96 between the compartment 56 and the compartment 48. After this occurs, the pressure on both sides of the piston 44 are substantially equal, thereby permitting the return spring 58 to urge the piston 44 and therefore the piston 64, to the right viewing FIG. 3, thereby relieving braking pressure in the chamber 78, the controlled wheel then reaccelerates, and when the wheel accelerates to a predetermined level, the logic controller permits solenoid valve 100 to close, thereby again terminating fluid communication between the chambers 48 and 56 and opens the valve 108 to permit fluid communication between the compartment 48 and the return port 16. Since high pressure fluid remains in the compartment 56, the piston 44 will again be urged to the left, to again develop braking pressure in the front wheel brakes. Operation of the solenoid valves 100 and 108 continues in a similar manner for an indefinite number of cycles until the vehicle is brought to a safe stop. Of course, the piston 46 is controlled in a similar manner to relieve and develop braking pressure in the rear wheel brakes of the vehicle, in a manner identical to that described above. Although, only two pistons 44 and 46 are illustrated in FIG. 3, it is apparent to those skilled in the art that any number of sets of pistons 44–64 and 46–72 may be provided, to correspond with the number of controlled channels provided in the electronic control unit.

High pressure fluid in the compartment 56 acting on the end 146 of the cartridge 118 normally maintains the latter in its rightward-most position when the brakes are actuated. However, if a malfunction in the vehicle's hydraulic system should terminate communication of high pressure fluid to the inlet port 12, the brakes may still be actuated manually. When this occurs, movement of the input rod 140 to the left engages the cartridge 118, moving the latter to the left until the caster 148 engages the ends of the pistons 44 and 46. Further movement of the input rod 140 urges the piston 44, 46 to the left, thereby developing pressure in the chambers 78 and 82 in the normal manner. Since the caster 148 is pivotally mounted on the cartridge 118, it may adjust for different distances which the pistons 44, 46 may travel in order to develop the same braking pressure in all of the vehicle's brakes. The check valve 150 permits residual fluid in the chamber 56 to escape when the brakes of the vehicle are actuated manually.

DETAILED DESCRIPTION OF THE FIRST ALTERNATE EMBODIMENT

Figure 2:
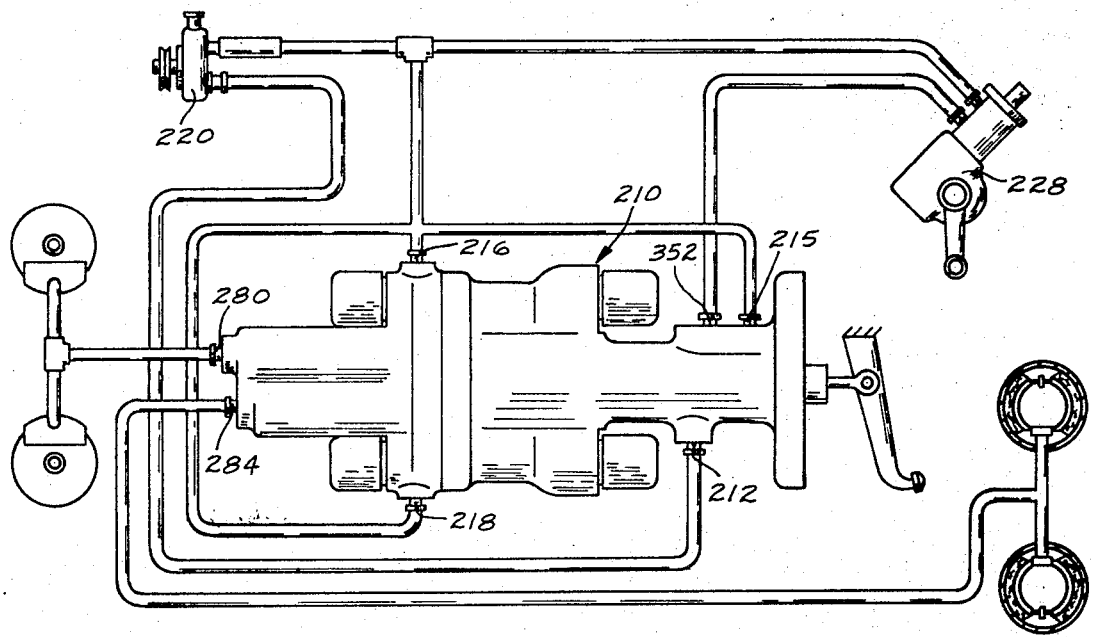
FIG. 2 is a schematic illustration of an "open-center" hydraulic system which incorporates a brake booster made pursuant to the teaching of our present invention.
Figure 4:
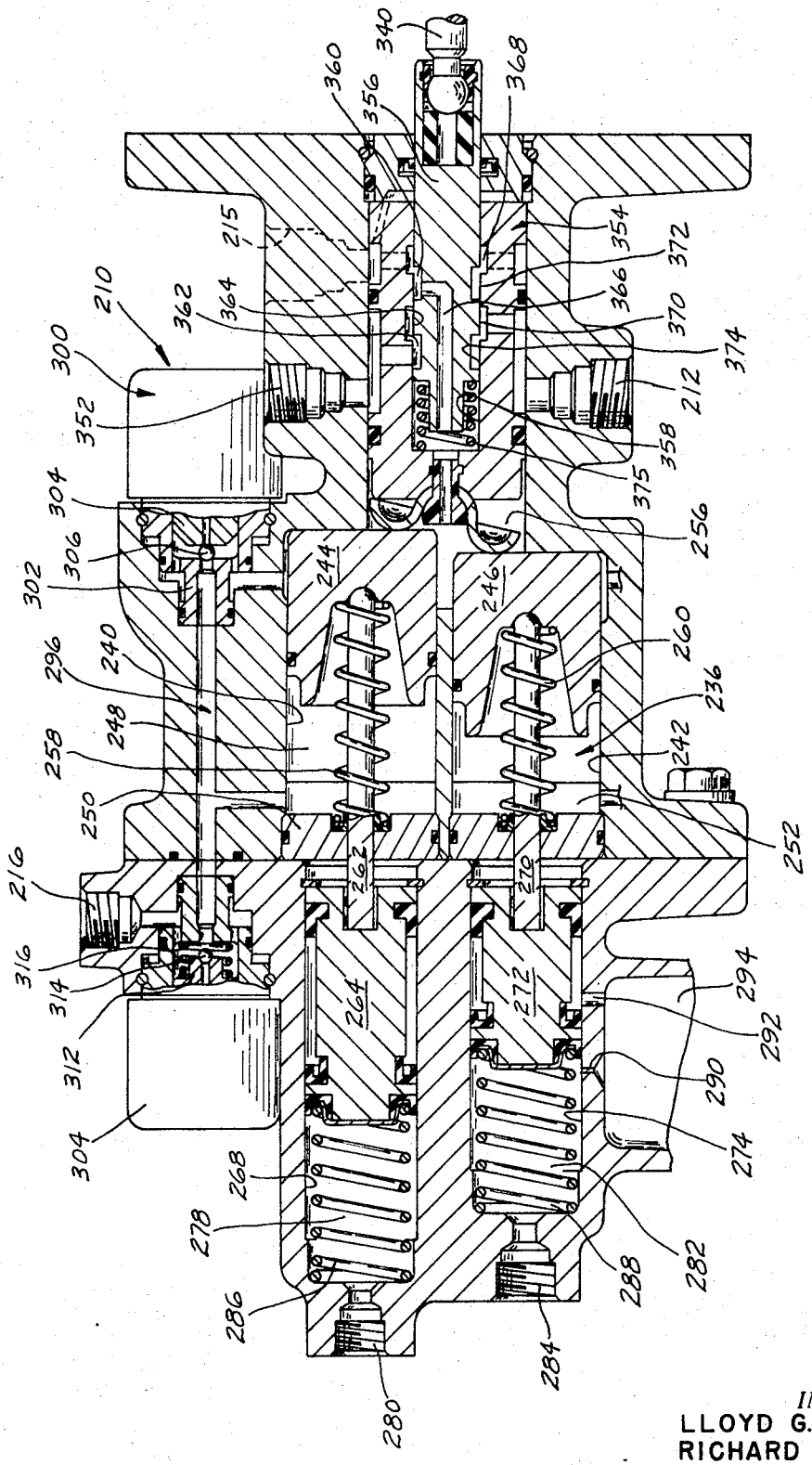
FIG. 4 is a longitudinal cross-sectional view of an integrated hydraulic brake booster and adaptive braking modulator which is used in the hydraulic system illustrated in FIG. 2.

In the embodiment of FIGS. 2 and 4, like elements retain the same reference numeral as corresponding elements in the preferred embodiment, but are increased by 200. Referring to FIG. 2, an integrated booster-modulator 210 is provided with a pressure port 212, return ports 215, 216, and 218, and an outlet port 352. The inlet port 212 is connected to the outlet or high pressure side of the vehicle's power steering pump 220, and the outlet port 352 is connected to the inlet of the vehicle's power steering gear 228. Each of the return ports 215, 216 and 218, and the outlet of the power steering gear 228, is connected to the inlet or low pressure side of the pump 220. Outlet ports 280 and 284 are communicated to the front and rear brakes of the vehicle respectively.

Referring now to FIG. 4, the internal components of the booster-modulator 210 are identical to the internal components of the booster-modulator 10, except that the closed-center valve cartridge 118 of the booster-modulator 10, is replaced by an open-center valve cartridge 354 in the booster-modulator 210. It is noted that ports 212, 215 and 352 each communicate with different circumferentially spaced grooves on the outer surface of cartridge 354. For convenience, port 215 is illustrated in phantom, rotated 60° from its actual position. Therefore, only the valve cartridge 354 will be described in detail, it being understood that the remainder of the booster-modulator 210 is identical to the booster-modulator 10 and therefore operates in an identical manner. The operator-operated input rod 340 is connected to a valve spool 356 which is slidably received within a bore 358 within the cartridge 354. The outer circumferential surface of the valve spool 356 is provided with grooves 360 and 362 which are separated by a land 364. A passage 366 within the valve spool 356 communicates the groove 360 with the pressure chamber 256. The wall of the bore 358 is provided with grooves 368 and 370 which are separated by a land 372. The groove 368 is communicated to the return port 215, the groove 362 is communicated to the outlet port 352, and the groove 370 is communicated to the inlet port 212.

The various components of the booster-modulator 210 are illustrated in FIG. 4 when the brakes of the vehicle are released. In this position, substantially uninhibited fluid communication is permitted between the groove 370 and the groove 362, thereby permitting almost uninhibited fluid communication between the pressure port 212 and the outlet port 352 so that a constant supply of fluid to the steering gear 228 is assured. When a brake application is effected, the valve spool 356 is urged to the left viewing FIG. 4, to bring the land 370 closer to the land 374 on the wall of the bore, such that the land 370 cooperates with the land 374 to define a flow-restricting orifice therebetween. Since fluid communication is thereafter inhibited between the grooves 370 and 362, the fluid pressure level is increased in the groove 370. At the same time, fluid communication between the grooves 360 and 368 is terminated, thereby also terminating fluid communication between the return port 215 and the compartment 256. As the spool valve is shifted a small additional distance, fluid communication between grooves 360 and 370 is initiated, thereby permitting the high pressure fluid in the groove 370 to be communicated into the pressure chamber 256, to operate the booster-modulator. The spool valve 356 and cartridge 354 are so designed that the land 364 can never engage the land 374 to completely terminate fluid communication to the steering gear 228, thereby assuring adequate fluid supply to the gear 228 during a braking maneuver. A spring 375 yieldably urges the valve spool 356 to the right viewing FIG. 4, towards the brake release position. As described hereinabove, high pressure fluid in the chamber 256 acts upon the piston 244, 246, to effect a brake application. The booster-modulator 210 operates in the adaptive mode in exactly the same manner as does the booster-modulator 10.

DETAILED DESCRIPTION OF THE SECOND ALTERNATE EMBODIMENT

Figure 5:
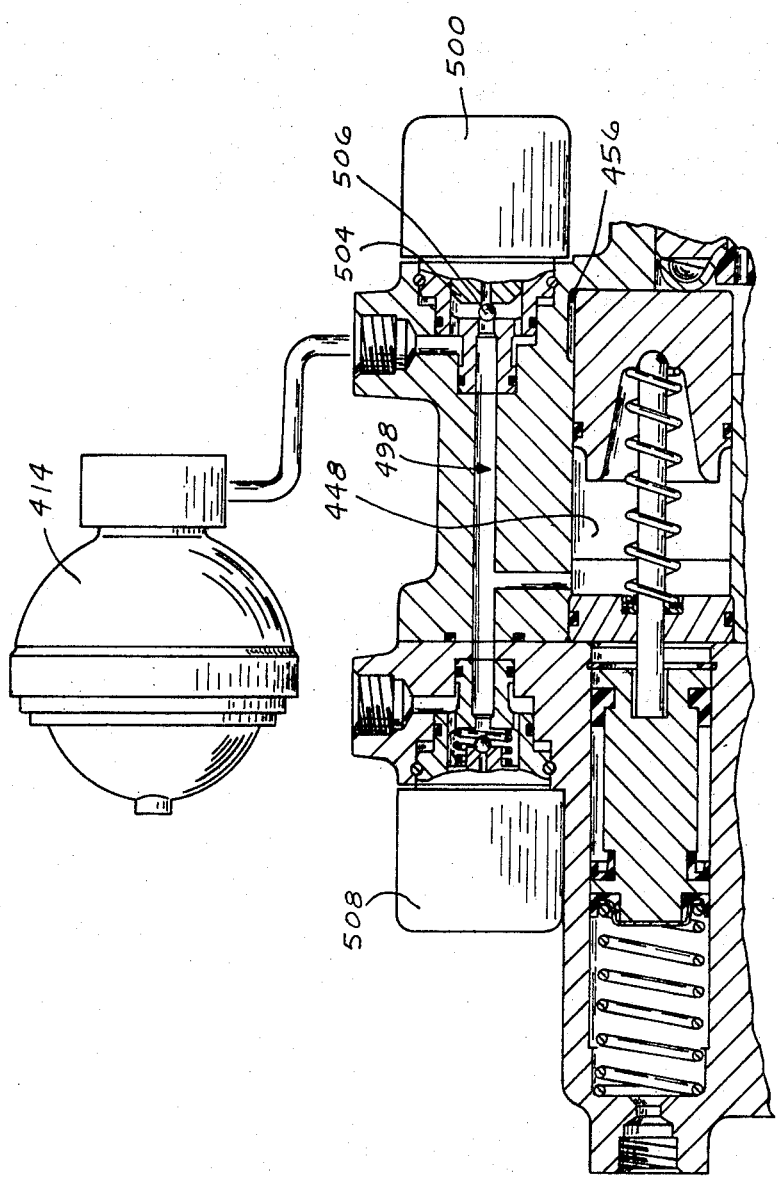
FIG. 5 is a fragmentary, cross-sectional view of a device similar to the device illustrated in FIG. 3, but illustrating another alternate embodiment of our invention.

In the embodiment of FIG. 5, the like reference numerals refers to the same components as do corresponding reference numerals in the preferred embodiment, but are increased by 400. The only difference between the embodiment of FIG. 5 and the embodiment of FIGS. 1 and 3 is that the first passage means 498 communicates the compartment 448 with the accumulator 414, instead of with the compartment 456. When a brake application is effected that required operation of the adaptive braking system, the solenoid valve 508 closes to terminate fluid communication between the compartment 448 and the low pressure reservoir described above in the preferred embodiment. However, the solenoid valve 500 thereafter opens to communicate the compartment 448 with the high pressure fluid stored in the accumulator 414, to urge the piston 444 in a brake release direction. since the pressure level in the accumulator 414 is substantially the same as the pressure level in the compartment 456, it will be readily apparent to those skilled in the art that the embodiment of FIG. 5 operates in precisely the same way as does the preferred embodiment.

We claim:

1. In an integrated brake booster and adaptive braking modulator for a vehicle:
   a housing defining a chamber therewithin;
   piston means slidably mounted in said chamber and defining a pair of compartments therewithin between opposite ends of said piston means and corresponding ends of the chamber;
   operator-operated valve means for controlling fluid communication between a pressure source and one of said compartments to slide said piston means toward one end of said chamber;
   brake pressure developing means responsive to movement of said piston means toward said one end of said chamber to develop braking pressure in at least one of the brakes of the vehicle; and
   electrically operated valve means for communicating high pressure fluid into the other compartment to permit movement of the piston means toward the other end of said chamber to relieve the pressure developed by said brake pressure developing means.

2. The invention of claim 1; and
   first passage means communicating said other compartment with relatively high pressure fluid;
   second passage means communicating said other compartment with a fluid reservoir;
   said electrically operated valve means normally permitting fluid communication through said second passage means and preventing fluid communication through said second passage means and preventing fluid communication through said first passage means, but permitting fluid communication through said first passage means and preventing fluid communication through said second passage means upon actuation of said electrically operated valve means to relieve the pressure developed by said brake pressure developing means.

3. The invention of claim 2:
   said electrically operated valve means including a normally closed solenoid valve in said first passage means and a normally open solenoid valve in said second passage means.

4. The invention of claim 3:
   said first passage means communicating said other chamber with said one chamber.

5. The invention of claim 2; and
   an accumulator for storing fluid under pressure, said operator-operated valve means controlling communication between said accumulator and said one compartment;
   said first passage means communicating said other compartment with said accumulator.

6. The invention of claim 1:
   said brake pressure developing means including a bore defined within said housing having an outlet port communicated with a vehicle brake and an inlet port communicating said bore with a fluid container, and pressure generating means slidably mounted in said bore for generating pressure therein; and
   means interconnecting said pressure generating means and said piston means so that said pressure generating means moves with said piston means to generate braking pressure in said bore when said piston means is moved toward said one end of the chamber and to relieve braking pressure in said bore when the piston means moves toward the other end of the chamber.

7. The invention of claim 6; and
   resilient means yieldably urging said piston means toward said other end of the chamber.

8. The invention of claim 1; and
   means dividing said chamber into first and second sections;
   said piston means including a first piston slidably mounted in the first section of the chamber and a second piston slidably mounted in the second section of the chamber, said dividing means also dividing said other compartment into first and second sections corresponding to said first and second pistons, the fluid pressure in said one compartment acting on each of said first and second pistons.

9. The invention of claim 8:
   said brake pressure developing means including first and second bores defined within said housing, said bores each having outlet ports communicated to the brakes of the vehicle, inlet ports communicating each of said bores with a separate fluid container, and first and second pressure generating members slidably mounted in said first and second bores, respectively; and
   first means interconnecting said first piston with said first pressure generating members and second means interconnecting said second piston with said second pressure generating members, whereby braking pressure is generated in a corresponding one of said bores when the corresponding piston is moved toward said one end of the chamber and braking pressure is relieved in the corresponding one of said bores when the corresponding piston is moved toward the other end of said chamber.

10. The invention of claim 9:

a cartridge slidably mounted in said housing, one end of said cartridge defining a portion of said other end of said chamber, said operator-operated valve means being mounted within said cartridge; and
an operator-operated input rod extending into said housing and slidably received within said cartridge for operating said operator-operated valve means;
said operator-operated input rod sliding said cartridge into engagement with said first and second pistons when a malfunction terminates fluid communication to said housing to provide a rigid link between said first and second pistons and said operator-operated input rod to permit manual operation of said first and second pistons.

11. The invention of claim 10; and
a castor pivotally mounted on the one end of the cartridge for engagement with said first and second piston.

12. The invention of claim 8:
a cartridge slidably mounted in said housing, one end of said cartridge defining a portion of said other end of said chamber, said operator-operated valve means being mounted within said cartridge; and
an operator-operated input rod extending into said housing and slidably received within said cartridge for operating said operator-operated valve means;
said operator-operated input rod sliding said cartridge into engagement with said first and second pistons when a malfunction terminates fluid communication to said housing to provide a rigid link between said first and second pistons and said operator-operated input rod to permit manual operation of said first and second pistons.

13. The invention of claim 12:
a castor pivotally mounted on the one end of the cartridge for engagement with said first and second pistons.

14. The invention of claim 1:
a cartridge slidably mounted in said housing, said operator-operated valve means being mounted within said cartridge; and
an operator-operated input rod extending into said housing and slidably received within said cartridge for operating said operator-operated valve means;
said operator-operated input rod sliding said cartridge into engagement with said piston means when a malfunction terminates fluid communication to said housing to provide a rigid link between said piston means and said operator-operated input rod to permit manual operation of said piston means.

15. The invention of claim 14:
one end of said cartridge defining a portion of said other end of said chamber, whereby fluid pressure in said chamber acting on said one end of the cartridge prevents movement of the latter.

16. The invention of claim 14:
said fluid pressure source being an accumulator, said operator-operated valve means including a valve shiftable from a first position preventing fluid communication between said accumulator and said one compartment and permitting fluid communication between said one compartment and a fluid reservoir to a second position terminating fluid communication between the one compartment and the reservoir and permitting fluid communication between the accumulator and said one compartment, and resilient means yieldably urging said valve toward the first position.

17. The invention of claim 14:
said housing having an inlet port communicated to said pressure source, an outlet port, and a return port communicated to a fluid reservoir;
said operator-operated valve means including a valve shiftable from a first position permitting substantially uninhibited fluid communication between said inlet and outlet ports and venting said one compartment to said return port to a second position terminating communication between said one chamber and the return port, restricting flow of fluid between the inlet and outlet ports to increase the fluid pressure level at the inlet port, and communicating said increased fluid pressure level at the inlet port to said one compartment and resilient means yieldably urging said spool valve to said first position.

18. The invention of claim 1:
said pressure source being an accumulator;
said operator-operated valve means being shiftable from a first position preventing communication between said accumulator and the one compartment and venting the latter to a fluid reservoir to a second position terminating fluid communication between the one compartment and the reservoir and initiating fluid communication between the one compartment and the accumulator, and resilient means yieldably urging said operator-operated valve means to said first position.

19. The invention of claim 1:
said housing having an inlet port communicated to said pressure source, an outlet port, and a return port communicated to a fluid reservoir;
said operator-operated valve means being shiftable from a first position permitting substantially uninhibited fluid communication between said inlet and outlet ports and venting said one compartment to said return port to a second position terminating fluid communication between said one chamber and the return port and restricting flow of fluid between the inlet and outlet ports to increase the fluid pressure level at the inlet port and communicating said increased fluid pressure level at the inlet port to said one compartment, and resilient means yieldably urging said operator-operated valve means to said first position.

* * * * *